US009950792B2

(12) United States Patent
Weitzel

(10) Patent No.: US 9,950,792 B2
(45) Date of Patent: Apr. 24, 2018

(54) AIRCRAFT AREA WITH A STORAGE CABINET FOR EMERGENCY EQUIPMENT OBJECTS

(71) Applicant: Airbus Operations GmbH, Hamburg (DE)

(72) Inventor: Sebastian Weitzel, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 40 days.

(21) Appl. No.: 14/256,162

(22) Filed: Apr. 18, 2014

(65) Prior Publication Data

US 2014/0224929 A1    Aug. 14, 2014

Related U.S. Application Data

(63) Continuation of application No. PCT/EP2012/004249, filed on Oct. 10, 2012.

(60) Provisional application No. 61/549,289, filed on Oct. 20, 2011.

(30) Foreign Application Priority Data

Oct. 20, 2011 (DE) .......................... 10 2011 116 523

(51) Int. Cl.
*B64D 9/00* (2006.01)
*B64D 11/00* (2006.01)
*B64D 11/04* (2006.01)
*B64D 25/00* (2006.01)

(52) U.S. Cl.
CPC ................. *B64D 9/00* (2013.01); *B64D 11/00* (2013.01); *B64D 11/0007* (2013.01); *B64D 11/04* (2013.01); *B64D 25/00* (2013.01)

(58) Field of Classification Search
CPC .................................. B64D 9/00; B64D 9/003
USPC ................................ 244/118.1, 118.5, 118.6
See application file for complete search history.

(56) References Cited

U.S. PATENT DOCUMENTS

| | | | | |
|---|---|---|---|---|
| 6,007,025 A * | 12/1999 | Coughren | ............ | B64D 11/02 105/329.1 |
| 6,412,603 B1 * | 7/2002 | Nervig | ............ | B64D 9/003 187/267 |
| 6,547,183 B2 * | 4/2003 | Farnsworth | ............ | B64D 11/003 244/118.1 |
| 8,047,467 B2 * | 11/2011 | Erickson | ............ | B64D 11/0015 244/118.1 |
| 8,387,916 B2 * | 3/2013 | Baatz | ............ | B64D 11/0007 244/118.1 |

(Continued)

FOREIGN PATENT DOCUMENTS

| | | |
|---|---|---|
| DE | 102008009938 | 9/2009 |
| EP | 2423107 | 2/2012 |
| WO | 2011101385 | 8/2011 |

OTHER PUBLICATIONS

International Search Report, dated Jan. 9, 2013.

*Primary Examiner* — Christopher P Ellis
*Assistant Examiner* — Michael H Wang
(74) *Attorney, Agent, or Firm* — Greer, Burns & Crain, Ltd.

(57) ABSTRACT

An aircraft area comprises a door, a door aisle and a main aisle. A storage cabinet for emergency equipment objects is disposed adjacent to the door aisle and/or the main aisle, and has an access point that is reachable from the door aisle and/or the main aisle.

9 Claims, 4 Drawing Sheets

(56) References Cited

U.S. PATENT DOCUMENTS

| | | | |
|---|---|---|---|
| 2004/0200931 A1* | 10/2004 | Sanford | B64C 1/1469 244/118.5 |
| 2006/0145002 A1* | 7/2006 | Van Loon | A47B 51/00 244/118.1 |
| 2006/0169840 A1* | 8/2006 | French | B64C 1/1469 244/118.5 |
| 2008/0001031 A1* | 1/2008 | Doebertin | B64D 11/04 244/118.1 |
| 2009/0261200 A1* | 10/2009 | Saint-Jalmes | B64D 11/04 244/118.5 |
| 2009/0302156 A1* | 12/2009 | Saint-Jalmes | A61G 3/001 244/118.6 |
| 2010/0181425 A1* | 7/2010 | Guering | B64D 11/00 244/118.5 |
| 2010/0218225 A1* | 8/2010 | Wilcynski | B60N 2/14 725/76 |
| 2010/0219292 A1* | 9/2010 | Saint-Jalmes | B64D 11/0023 244/118.5 |
| 2012/0048998 A1* | 3/2012 | Schliwa | B64D 11/00 244/118.6 |
| 2012/0325960 A1* | 12/2012 | Saint-Jalmes | B64D 11/0007 244/118.1 |
| 2013/0001359 A1 | 1/2013 | Schliwa et al. | |
| 2014/0054416 A1* | 2/2014 | Lee | B64D 47/00 244/118.1 |
| 2015/0115100 A1* | 4/2015 | Schliwa | B64D 11/003 244/118.1 |

\* cited by examiner

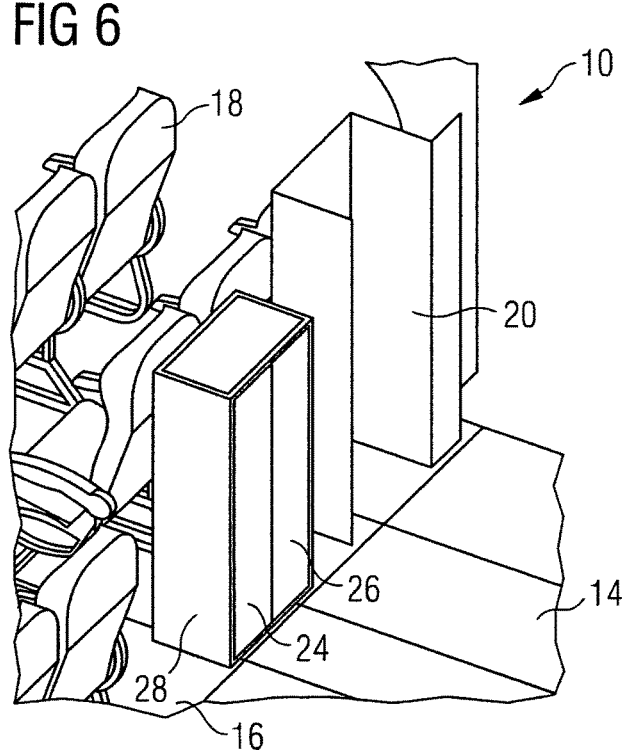
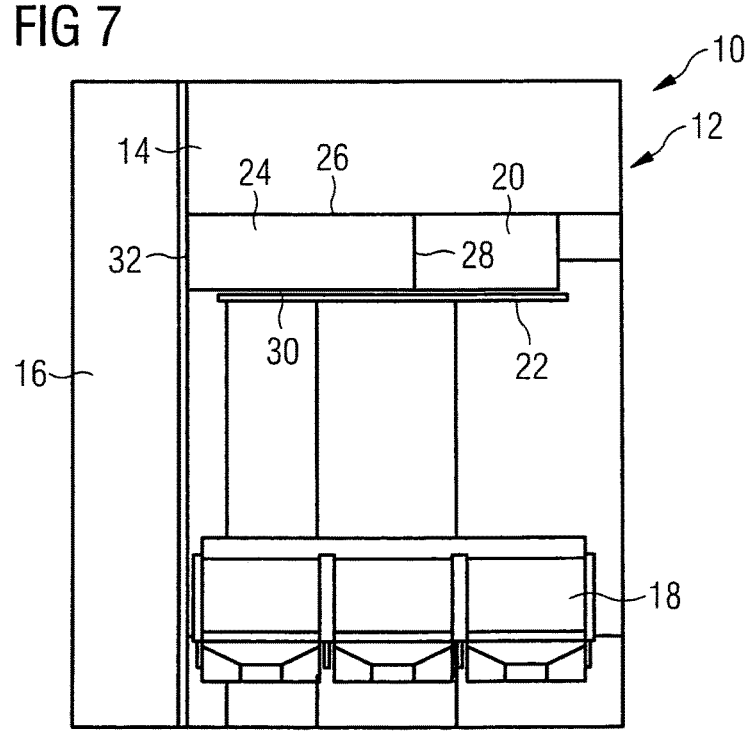

AIRCRAFT AREA WITH A STORAGE CABINET FOR EMERGENCY EQUIPMENT OBJECTS

CROSS-REFERENCES TO RELATED APPLICATIONS

This application is a continuation of International Application PCT/EP2012/004249 filed Oct. 10, 2012, designating the United States and published on Apr. 25, 2013 as WO 2013/056796. This application also claims the benefit of the U.S. Provisional Application No. 61/549,289, filed on Oct. 20, 2011, and of the German patent application No. 10 2011 116 523.5, filed on Oct. 20, 2011, the entire disclosures of which are incorporated herein by way of reference.

BACKGROUND OF THE INVENTION

The invention relates to an aircraft area in which a storage cabinet for emergency equipment objects is provided.

On board modern passenger aircraft, it is necessary to hold various emergency equipment objects, such as, for example, first aid packs, survival kits and the like, in readiness. Currently, these objects are usually stored in overhead baggage lockers which are disposed in the ceiling area of the passenger cabin of the aircraft, above the passenger seats. However, this results in the loss of storage space which is actually intended for the passengers' items of baggage. In addition, in an emergency, emergency equipment objects are needed, as a rule, in the vicinity of the aircraft doors through which the passengers and air crew leave the aircraft. In an emergency, therefore, emergency equipment objects which are stored in overhead baggage lockers further away from the aircraft doors have first to be laboriously transported into the door areas of the aircraft cabin before they can be used or distributed to the persons leaving the aircraft.

A storage locker for emergency equipment objects which is let into the floor of an aircraft cabin in the door areas of the latter is known from DE 10 2008 009 938 B4.

SUMMARY OF THE INVENTION

The object towards which the invention is directed is to indicate an aircraft area whose layout permits the disposition of a storage cabinet for emergency equipment objects which is accessible in a simple and convenient manner, in a door area of the passenger cabin of an aircraft, with optimum utilization of the available space.

An aircraft area according to the invention, which is preferably part of the passenger cabin of an aircraft, comprises an aircraft door and also a door aisle which preferably extends substantially perpendicularly to a longitudinal axis of the passenger cabin of an aircraft in the direction of the aircraft door. Also present is a main aisle which preferably extends substantially perpendicularly to the door aisle in a manner parallel to the longitudinal axis of the passenger cabin of the aircraft.

A storage cabinet for emergency equipment objects is disposed adjacent to the door aisle and/or the main aisle in the passenger cabin of the aircraft, and has an access point that can be reached from the door aisle and/or the main aisle. The access point to the storage cabinet may be designed, for example, in the form of an opening which is constructed in a front side or a side wall of said storage cabinet and through which an inner compartment in the storage cabinet is accessible from the door aisle and/or the main aisle. The opening may be closable by means of a suitable covering device, for example a swivellable flap. Said swivellable flap may be designed, for example, in the form of a cabinet door. It is also conceivable for the access point to the storage cabinet to be embodied by configuring the latter with a drawer or the like. All that is essential is that the inner compartment of the storage cabinet is conveniently accessible for a person located in the door aisle and/or the main aisle.

The size and shape of the storage cabinet is chosen in such a way that emergency equipment objects, such as, for example, first aid packs or survival kits, can be accommodated in said cabinet. Furthermore the access point to the storage cabinet is so designed and dimensioned that a person located in the door aisle and/or the main aisle is able to conveniently remove the emergency equipment objects stored in the storage cabinet from the latter. As a result of the disposition according to the invention of a storage cabinet for emergency equipment objects in the door area of the passenger cabin of an aircraft, it is no longer necessary to accommodate said objects in the overhead baggage lockers disposed in the passenger cabin above the passenger seats, and thereby to obstruct the storage space intended for the passengers' items of baggage. In addition, there is no need, in an emergency, for the emergency equipment objects to be first of all transported through the passenger cabin into the door area.

The storage cabinet may be integrated into a monument provided in the aircraft area. The monument in question may be, for example, a galley or a toilet module. The integration of the storage cabinet into a monument permits a particularly optimized utilization of space within the aircraft area.

As an alternative to this, however, the storage cabinet may also be disposed adjacent to a monument provided in the aircraft area, and be constructed in a manner separate from said monument. In this case, the monument may be a galley, a toilet module or a partition. If desired, the storage cabinet may directly border on the monument.

The monument may have an L-shaped, rectangular or other suitable footprint. The storage cabinet may, in particular, be integrated into a side area of the monument that faces towards the main aisle, or border on a side wall of said monument that faces towards the main aisle. If the aircraft area is configured in this way, the storage cabinet is then accessible at least from the main aisle.

In the direction of the main aisle, the storage cabinet may have at least the same length as the monument. The storage cabinet preferably extends along the main aisle as far as the door aisle. In the case of a disposition of this kind, the storage cabinet borders both on the main aisle and on the door aisle and may then be provided, in a particularly flexible manner, with an access point that can be reached from the main aisle and/or an access point that can be reached from the door aisle.

It is preferable if the monument and the storage cabinet have an L-shaped footprint. If the aircraft area is configured in this way, the storage cabinet preferably extends in the direction of the door aisle, that is to say along the main aisle as far as said door aisle, while the monument borders on the storage cabinet on a rear side of the latter that faces away from the main aisle.

An assist space which borders on the door aisle is also preferably provided in the aircraft area. Said assist space is preferably so dimensioned, and disposed adjacent to the aircraft door in such a way, that at least one person is able to stand in the assist space without impeding persons who are passing into, or out of, the passenger cabin of the aircraft through the door of the latter.

The storage cabinet may be disposed immediately adjacent to the assist space in a manner bordering on the door aisle. Said storage cabinet may then delimit a recess that forms the assist space. If desired, it is possible to dispose on the storage cabinet, that is to say on a side wall of the latter, a handle or the like onto which a person standing in the assist space can hold if necessary.

The storage cabinet may also be disposed in a manner bordering on the door aisle at a distance from the assist space, the distance between said assist space and the storage cabinet being then preferably chosen in such a way that the space remaining free between the assist space and the storage cabinet can be used as a trolley-parking place. Such a configuration of the aircraft area permits particularly satisfactory utilization of the space available in a door region of the passenger cabin of an aircraft.

Finally, a monument, particularly a monument which is constructed in the form of a partition, may border on the storage cabinet on a rear side that faces away from the door aisle, of a storage cabinet which borders on said door aisle.

BRIEF DESCRIPTION OF THE DRAWINGS

Preferred forms of embodiment of the invention will now be explained in greater detail with the aid of the appended diagrammatic drawings, in which:

FIG. 6 shows a three-dimensional representation of the aircraft area according to FIG. 5; and FIG. 7 shows a fifth form of embodiment of an aircraft area having a storage cabinet for emergency equipment objects.

DETAILED DESCRIPTION OF THE PREFERRED EMBODIMENTS

Figure 1:
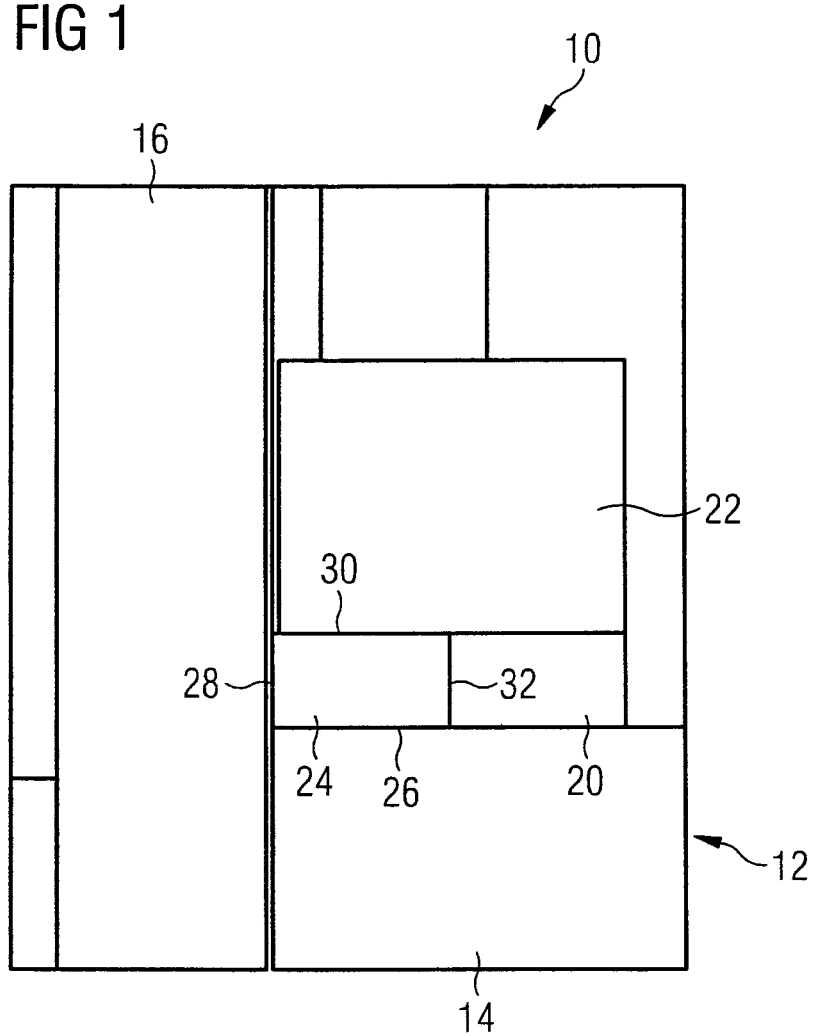
FIG. 1 shows a first form of embodiment of an aircraft area having a storage cabinet for emergency equipment objects.

FIGS. 1 to 7 show various forms of embodiment of an aircraft area 10 which forms part of the passenger cabin of an aircraft. An aircraft door 12 is provided in said aircraft area. A door aisle 14 extends from the aircraft door 12 substantially perpendicularly to a longitudinal axis of the aircraft, and opens into a main aisle 16. In the exemplified embodiments shown, the door aisle 14 and the main aisle 16 extend substantially perpendicularly to one another, that is to say the main aisle 16 runs substantially parallel to the longitudinal axis of the aircraft. Passenger seats 18 disposed in rows are positioned along the main aisle 16 on either side of the latter.

An assist space 20 is provided adjacent to the aircraft door. The assist space 20 is so dimensioned that it is able to accommodate at least one person standing up; that is to say, a person standing in the assist space 20 does not impede persons who are passing into, or out of, the aircraft area 10 through the aircraft door 12. As becomes clear from the drawings, the assist space 20 is at a certain distance from the aircraft door 12. This distance is required because of the fact that an aircraft fuselage is usually of curved construction and the passenger cabin therefore has a reduced height in its side-wall areas. The distance of the assist space 20 from the aircraft door 12 can be varied according to the type of aircraft, that is to say, according to the size of the aircraft fuselage and the height of the passenger cabin. All that is essential is that at least one person is able to stand in the assist space 20 comfortably, that is to say without stooping.

In the arrangement according to FIGS. 1, 2, 3, 4 and 7, the assist space 20 borders on a wall of an aircraft monument 22 that faces towards the door aisle 14. The monument 22 may be constructed in the form of a galley or of a toilet module. As an alternative to this, however, the monument 22 may also be designed in the form of a partition, see FIG. 7.

Finally, a storage cabinet 24 is provided in the aircraft area 10. Said storage cabinet 24 is so dimensioned that it is suitable for storing emergency equipment objects, such as, for example, first aid packs, survival kits, etc. In the configuration according to FIG. 1, the storage cabinet 24 is disposed adjacent to the assist space 20 in a manner immediately bordering on the door aisle 14. In particular, a front side 26 of the storage cabinet 24 borders on the door aisle 14, whereas a first side wall 28 of said storage cabinet 24 borders on the main aisle 16. A rear wall 30 of the storage cabinet 24 borders on a side wall of the monument 22 that faces towards the door aisle 14. Finally, a second side wall 32 of the storage cabinet 24 delimits the assist space 20. Said second side wall 32 of the storage cabinet 24 may serve as the lateral boundary of the assist space 20 and may, for example, carry a handle onto which a person standing in said assist space 20 can hold if necessary. As an alternative to this, however, a separate partition that defines the assist space 20 may be also be provided in the aircraft area 10, see FIG. 3.

The storage cabinet 24 has an access point which can be reached from the door aisle 14 and which is formed by an opening of which no further details are illustrated, but which is constructed in the front side 26 of said storage cabinet 24 and is closed by a suitable covering flap. Emergency equipment objects accommodated in the storage cabinet 24 no longer need to be stored in the overhead baggage lockers provided in the passenger cabin, where they obstruct the storage space intended for the passengers' items of baggage. In addition, it is no longer necessary to transport the emergency equipment objects through the passenger cabin, since they can be removed directly from the storage cabinet 24 and used, for example distributed to persons leaving the aircraft area 10.

Figure 2:
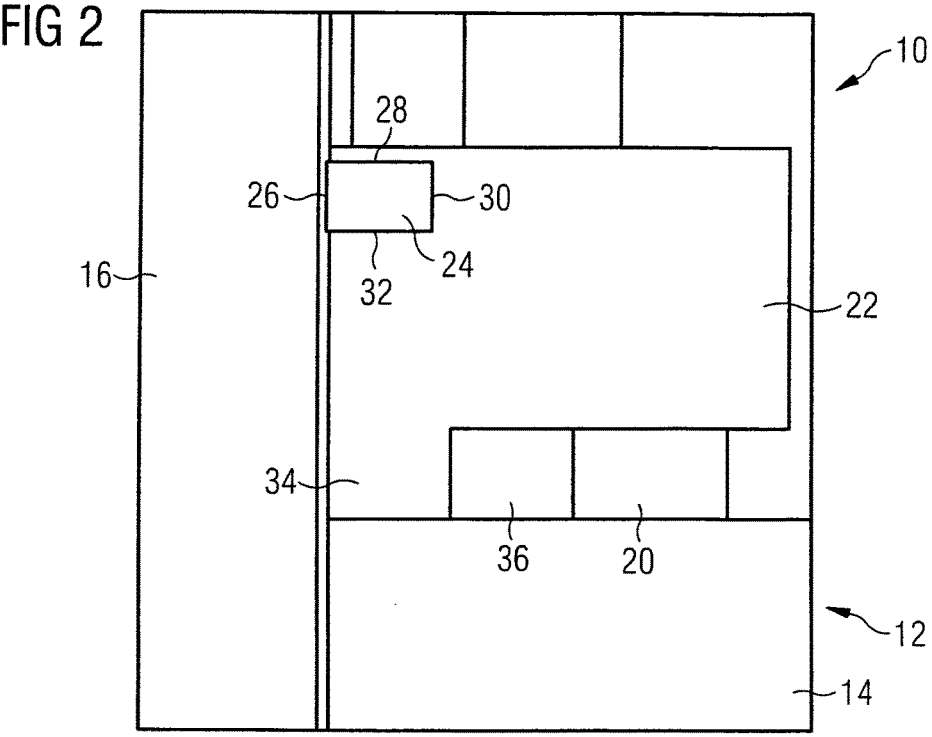
FIG. 2 shows a second form of embodiment of an aircraft area having a storage cabinet for emergency equipment objects.
Figure 3:
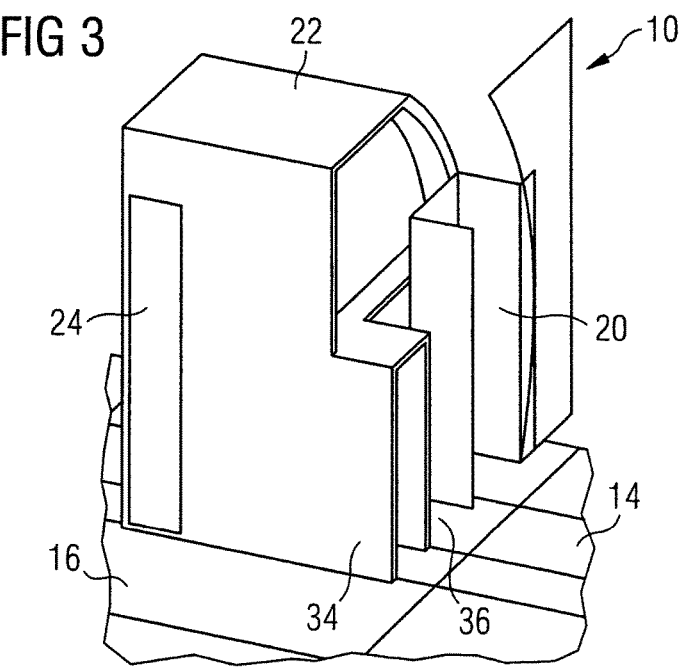
FIG. 3 shows a three-dimensional representation of the aircraft area according to FIG. 2.

In the exemplified embodiment of an aircraft area 10 shown in FIGS. 2 and 3, the monument 22 is constructed in the form of a galley and has an L-shaped footprint. A free space 36, which is so shaped and dimensioned that it can be used as a trolley-parking place, is provided between the assist space 20 and a section 34 that projects in the direction of the door aisle 14. The storage cabinet 24 for emergency equipment objects is integrated into the monument 22 in the area of a side wall of said monument 22 that faces towards the main aisle 16. The storage cabinet 24 thus has an access point that can be reached from said main aisle 16. The access point to the storage cabinet 24 is, once again, formed by an opening which is constructed in said storage cabinet 24 and is closed by a closable flap.

Figure 4:
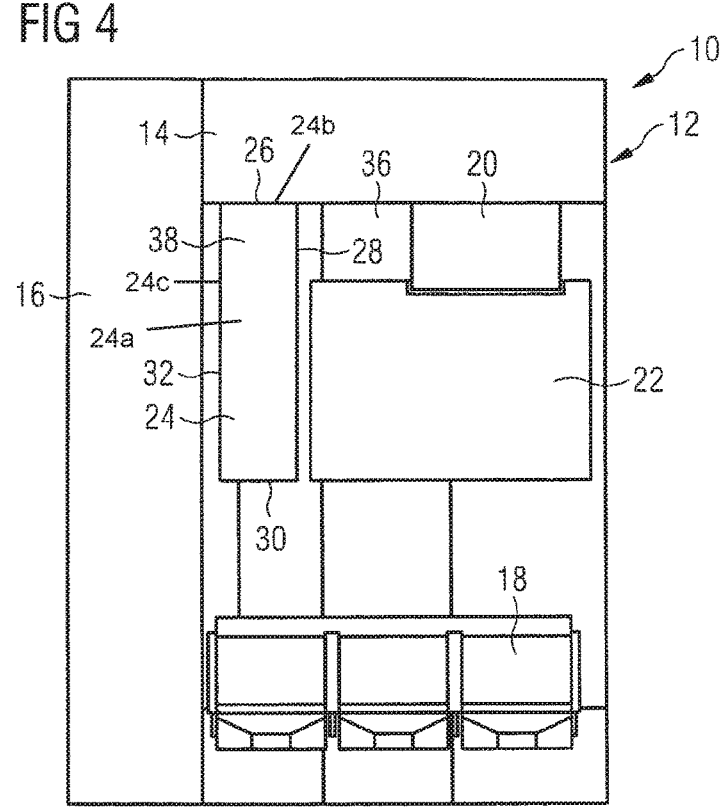
FIG. 4 shows a third form of embodiment of a storage cabinet for emergency equipment objects.

In the embodiment of an aircraft area 10 illustrated in FIG. 4, the monument 22 is, once again, constructed in the form of a galley which now, however, has a rectangular footprint. A storage cabinet 24 extends along a side wall of the monument 22 that faces towards the main aisle 16, the longitudinal extent of said storage cabinet 24 along said main aisle 16 being greater than that of the monument 22. Said monument 22 and the storage cabinet 24 thus jointly form an L-shaped footprint. In the disposition according to FIG. 4, an inner compartment 24a in the storage cabinet 24 may be provided with two access points 24b, 24c, of which one access point 24b can be reached from the door aisle 14 and one access point 24c can be reached from the main aisle 16. A free space 36, which is so shaped and dimensioned that it can be used as a trolley-parking place, is once again provided between a section 38 of the storage cabinet 24 that borders on the door aisle 14, and the assist space 20.

Figure 5:
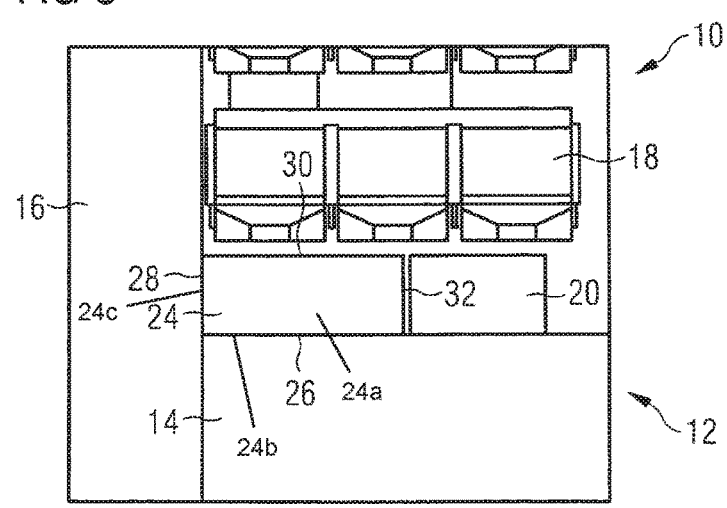
FIG. 5 shows a fourth form of embodiment of an aircraft area having a storage cabinet for emergency equipment objects.

FIGS. 5 and 6 show an aircraft area 10 in which the storage cabinet 24 borders, with its front side 26, on the door aisle 14 and, with its side wall 28, on the main aisle 16. The second side wall 32 of the storage cabinet 24 borders on the assist space 20. Rows of passenger seats are provided in a manner bordering on the rear wall 30 of the storage cabinet 24, a distance between a passenger seat 18 adjacent to the storage cabinet 24 and said storage cabinet 24 being chosen in such a way that said storage cabinet 24 does not impede the folding-back of a backrest belonging to the passenger seat 18.

Finally, the aircraft area 10 according to FIG. 7 differs from the disposition according to FIG. 6 through the fact that a monument 22 designed in the form of a partition is provided in a manner bordering on the rear wall 30 of the storage cabinet 24 and the assist space 20. Rows of passenger seats are then positioned at a suitable distance from the monument 22.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft area comprising:
   a door,
   a main aisle, and
   a door aisle extending from the door and opening into the main aisle,
   wherein an assist space bordering on the door aisle is also provided in the aircraft area, the assist space being so dimensioned and disposed adjacent to the door that at least one person is able to stand in the assist space without impeding persons passing in and out of the passenger cabin through the door,
   wherein a storage cabinet for emergency equipment objects is disposed adjacent to the door aisle and the main aisle in the aircraft area, the storage cabinet being disposed adjacent to the assist space in a manner bordering on the door aisle, and has an inner compartment with two access points, of which one is reachable from the door aisle and one is reachable from the main aisle,
   wherein the storage cabinet is integrated into a monument comprising a galley provided in the aircraft area, and
   wherein the storage cabinet is disposed in a manner bordering on the door aisle at a distance from the assist space, the distance between said assist space and the storage cabinet being such that the space remaining free between the assist space and the storage cabinet is usable as a trolley-parking place,
   wherein the monument has a rectangular footprint and the assist space is formed by three walls that are recessed within the monument or wherein the monument has an L-shaped footprint, so that the assist space is formed by two walls recessed within the monument and a side wall of the aircraft disposed next to the door.

2. The aircraft area according to claim 1, wherein the storage cabinet is integrated into a side area of the monument that faces towards the main aisle.

3. The aircraft area according to claim 2, wherein, in a direction of the main aisle, the storage cabinet has at least the same length as the monument, so that the storage cabinet borders both on the main aisle and on the door aisle.

4. The aircraft area according to claim 3, wherein the monument and the storage cabinet jointly have an L-shaped footprint.

5. The aircraft area according to claim 1, wherein the storage cabinet is integrated into a side area of the monument that borders on a side wall of said monument that faces towards the main aisle.

6. The aircraft area according to claim 5, wherein, in a direction of the main aisle, the storage cabinet has at least the same length as the monument, so that the storage cabinet borders both on the main aisle and on the door aisle.

7. The aircraft area according to claim 6, wherein the monument and the storage cabinet jointly have an L-shaped footprint.

8. The aircraft area according to claim 1, wherein a monument borders on the storage cabinet on a rear side that faces away from the door aisle.

9. The aircraft area according to claim 8, wherein the monument is constructed in the form of a partition.

* * * * *